United States Patent [19]

Fujita et al.

[11] Patent Number: 4,872,881
[45] Date of Patent: Oct. 10, 1989

[54] MIXTURES OF WATER-SOLUBLE RED AND YELLOW OR BLUE REACTIVE DYES AND A METHOD OF DYEING CELLULOSIC FIBERS USING SUCH DYE MIXTURES

[75] Inventors: Takashi Fujita; Toshio Hihara, both of Kitakyushu; Yoshio Kogure, Takarazuka; Riyouichi Sekioka; Noboru Nakamura, both of Kitakyushu, all of Japan

[73] Assignee: Mitsubishi Kasei Corporation, Tokyo, Japan

[21] Appl. No.: 269,146

[22] PCT Filed: Mar. 1, 1988

[86] PCT No.: PCT/JP88/00226
§ 371 Date: Oct. 31, 1988
§ 102(e) Date: Oct. 31, 1988

[87] PCT Pub. No.: WO89/00184
PCT Pub. Date: Jan. 12, 1989

[30] Foreign Application Priority Data

Jun. 30, 1987 [JP] Japan .................. 62-163166

[51] Int. Cl.$^4$ ............... C09B 62/00; C09B 67/22; D06P 1/38
[52] U.S. Cl. ................... 8/549; 8/543; 8/639; 8/641; 8/681; 8/682; 8/686; 8/687; 8/688; 8/918
[58] Field of Search .................. 8/549, 639, 641

[56] References Cited

U.S. PATENT DOCUMENTS

| | | | |
|---|---|---|---|
| 4,412,948 | 11/1983 | Omura et al. | 534/637 |
| 4,425,270 | 1/1984 | Yamada et al. | 534/637 |
| 4,556,706 | 12/1985 | Hegar et al. | 534/618 |
| 4,713,082 | 12/1987 | Scheibli et al. | 8/549 |
| 4,720,542 | 1/1988 | Omura et al. | 534/618 |

FOREIGN PATENT DOCUMENTS

| | | |
|---|---|---|
| 0099721 | 2/1984 | European Pat. Off. |
| 46-00824 | 1/1971 | Japan |
| 56-128380 | 10/1981 | Japan |
| 57-057754 | 4/1982 | Japan |
| 59-096174 | 6/1984 | Japan |
| 60-260654 | 12/1985 | Japan |
| 2029850 | 3/1980 | United Kingdom |

OTHER PUBLICATIONS

Japanese Examined Patent Publication No. 824/1971, (Derwent's English Abstract attached: BAJ accession No. *2964S) BAJ Accession No. *: Accession No. of Basic Abstract Journal JOURNAL Published by Derwent.
Japanese Unexamined Patent Publication No. 128380/1981, (Derwent's English Abstract Attached: BAJ accession No. 85990D).
Japanese Unexamined Patent Publication No. 260654/1985, (Derwent's English Abstract attached: BAJ accession No. 86-39754.
Japanese Unexamined Patent Publication No. 96174/1984 (Derwent's English Abstract attached: BAJ accession No. 84-174025.
Japanese Unexamined Patent Publication No. 57754/1984 (Derwent's English Abstract attached: BAJ accession No. 39937E).

*Primary Examiner*—A. Lionel Clingman
*Attorney, Agent, or Firm*—Oblon, Spivak, McClelland, Maier & Neustadt

[57] ABSTRACT

A dye mixture and a method of dyeing cellulosic fibers by use of the dye mixture, the dye mixture being capable of dyeing the cellulosic fibers favorably even in the presence of a small amount of an inorganic salt at dyeing, and being composed of a blend of a red water-soluble reactive dye to be represented by the following general formula (I) in the form of free acid, and a specific yellow and/or blue water-soluble reactive dye:

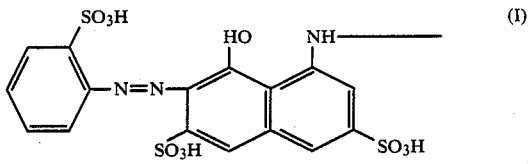

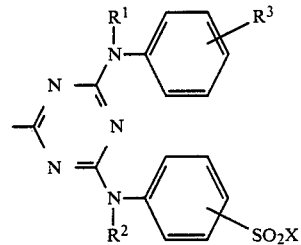

(where: each of $R^1$ and $R^2$ denotes a hydrogen atom or a lower alkyl group which may contain therein a substituent; $R^3$ represents a hydrogen atom, a lower alkyl group or a halogen atom and X designates —CH=CH$_2$ or —C$_2$H$_4$OSO$_3$H).

38 Claims, No Drawings

MIXTURES OF WATER-SOLUBLE RED AND YELLOW OR BLUE REACTIVE DYES AND A METHOD OF DYEING CELLULOSIC FIBERS USING SUCH DYE MIXTURES

TECHNICAL FIELD

This invention relates to mixtures of water-soluble reactive dyes and a method of dyeing cellulosic fibers using such dye mixtures. More particularly, it is concerned with mixtures of water-soluble reactive dyes which are excellent in various dyeing properties and are prepared by blending a yellow and/or blue dye having a particular chemical structure with a red dye, as the base, having a particular chemical structure; and a method of dyeing cellulosic fibers using such dye mixtures.

BACKGROUND TECHNOLOGY

The water-soluble reactive dyes (hereinafter simply called "reactive dyes") have heretofore been used widely as the dyestuff for dyeing cellulosic fibers. As the method of dyeing the fiber materials with use of such reactive dyes, there have been adopted various known techniques such as exhaustion method and printing method. Of these various dyeing methods, the exhaustion method for dyeing the cellulosic fibers requires the presence, in the dye bath, of inorganic salts such as Glauber's salt, edible salt, and others together with alkali. In particular, for obtaining dyed fabrics of high density, it is usually necessary that approximately 50 to 100 g of the inorganic salt per 1 liter of the dye bath be added. If the added quantity of the inorganic salt is too small, it is not possible to dye the cellulosic fibers to an intended color hue.

In recent years, reduction in quantity of the inorganic salts in the dye bath has been desired from the standpoint of rationalizing the operations in the dyeing factories. In other words, the reduction in the quantity of the inorganic salts not only leads to reduction in the manufacturing cost, but also to reduction in the load imposed on disposal of the waste water from the dye bath. Accordingly, for the purpose of such dyeing method, there is a demand for reactive dyes which are not only superior in their fastness to various circumstances as well as their reproducibility, but also are capable of favorably dyeing the cellulosic fibers even under a condition wherein the density of the inorganic salt is, for example, as low as 5 to 40 g per 1 liter of the dye bath. While there have so far been known a large number of reactive dyes, however, almost all of them would require a large amount of the inorganic salt at the time of dyeing.

The present inventors conducted researches for presence of dyes which are suited for the above-mentioned purpose in those known reactive dyes, as the result of which they have discovered that, when use is made of a red reactive dye to be represented by the following general formula (I) in the form of free acid, there could be obtained a favorable dyed article, even when the amount of the inorganic salt in the dye bath is reduced to 1/5 to 1/10 of the amount which has been used conventionally:

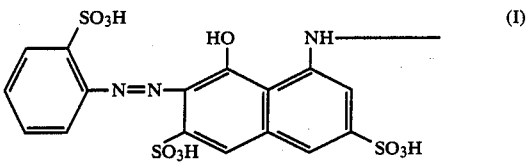

(where: each of $R^1$ and $R^2$ denotes a hydrogen atom or a lower alkyl group which may contain therein a substituent; $R^3$ represents a hydrogen atom, a lower alkyl group or a halogen atom; and X designates $-CH=CH_2$ or $-C_2H_4OSO_3H$).

Incidentally, the structure of the reactive dye as shown in the above general formula (I) has been known in part, and reactive dyes included in the above general formula (I) are disclosed in, for example, Japanese Unexamined Patent Publications No. 212467/1987 and No. 260654/1985.

In case the reactive dye of the above-shown general formula (I) is used singly, a favorable dyeing result can be obtained even under the low concentration condition of the inorganic salt. However, when it is used in mixture with yellow dye and/or blue dye, the characteristic properties of the reactive dye as shown in the above general formula (I) cannot be exhibited to the satisfactory extent, unless the dye mixture is capable of dyeing favorably the fabrics under such low concentration condition of the inorganic salt. Accordingly, these yellow and blue dyes to be used in a mixture with the reactive dye of the above-indicated general formula (I) should be such that they are able to dye favorably the fabrics with a small amount of the inorganic salt. It is also necessary in this case that those reactive dyes to be selected possess the same level of fastness under various circumstances, dyeing speed, reproducibility, heat-stability and other physical properties as those of the reactive dye shown in the above general formula (I), and also have good compatibility with the red dyes.

That is to say, even when the reactive dye of the above formula (I) is used as the red dye, a mixed dye, in which any arbitrary dye in yellow or blue is blended, has its possible defect such that it is unable to dye the material to an intended color hue at such dyeing condition where the inorganic salt is present in low concentration, or, even if the intended color hue is attained it has high dependency on the salt-concentration or the temperature, hence it possesses insufficient reproducibility, and others.

On the other hand, a report of Hayakashi et al. "On Diamira SN Series Dyes" (Dyeing Method with Recommended Three Primary Colors with Reduced Amount of Glauber's Salt)", Senshoku Kogyo (Dyeing Industry), Vol. 34, No. 2, 1986, pp81 to 93, introduces therein, in codes, each of reactive dyes in three primary colors which are available in general commercial market and capable of dyeing materials with a small quantity of the inorganic salt (Glauber's salt), although no chemical structure whatsoever of these reactive dyes are presented in the report.

DISCLOSURE OF THE INVENTION

In view of the above-mentioned circumstances, the present inventors have made various studies with a view to providing the mixtures of dyes which are capable of dyeing materials with favorable result even under a low concentration condition of the inorganic salt, in case the red reactive dye of the above-mentioned general formula (I) is used in a mixture with yellow and/or blue dye, and which possess well-balanced dyeing properties of the component dyes in each color. As the result of such studies, they have discovered that, by blending yellow and blue dyes of certain particular structures, the resulting dye mixtures will become able to exhibit their generally excellent properties. Based on such finding, the present invention has been completed.

That is to say, the gist of the present invention resides in providing a water-soluble reactive dye mixture and a method for dyeing cellulosic fibers using such dye mixture, in which a yellow and/or blue water-soluble reactive dye is blended with a red water-soluble reactive dye having the above-mentioned general formula (I), the dye mixture and the method of dyeing being characterized in that the yellow dye is the water-soluble reactive dye to be represented by the following general formula (II) in the form of free acid:

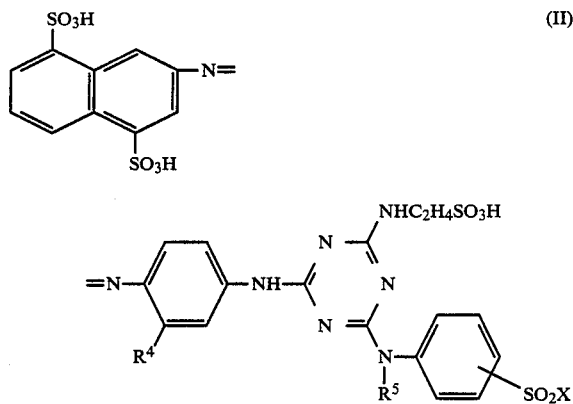

(where: R⁴ denotes a —NHCOCH₃ group, a —NHCOC₂H₅ group, a —NHCONH₂ group or a —NHCOSO₂CH₃ group; R⁵ represents a hydrogen atom or a lower alkyl group which may contain therein a substituent; and X has the same definition as in the above-indicated general formula (I));

and that the blue dye is at least one kind of the water-soluble reactive dyes to be represented by the following general formulas (III) to (VI) in the form of free acid:

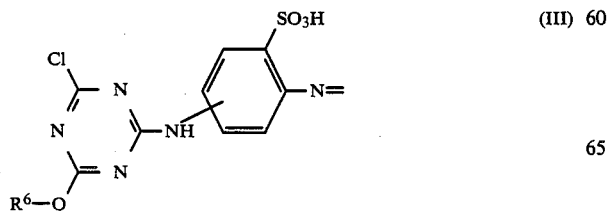

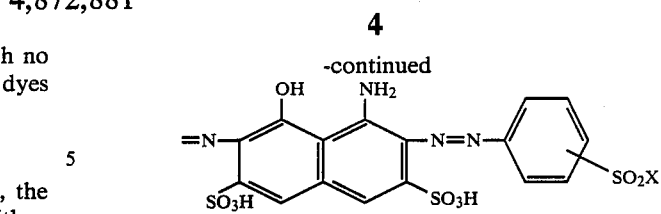

(where: R⁶ indicates a lower alkyl group; and X has the same definition as in the above-indicated general formula (I));

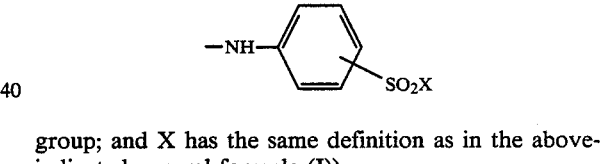

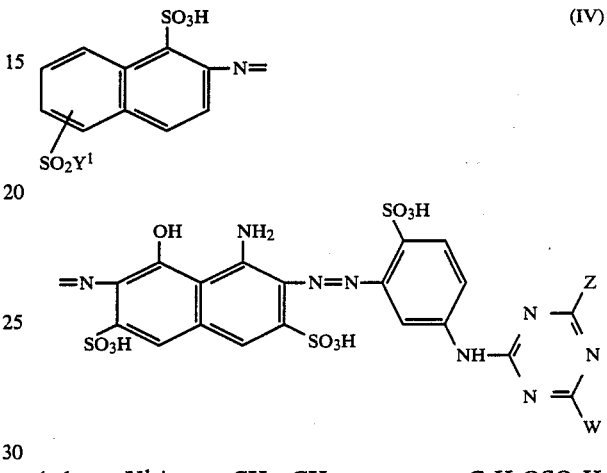

(where: Y¹ is a —CH=CH₂ group, a —C₂H₄OSO₃H group, or a —OH group; Z represents a chlorine atom or a fluorine atom; W indicates a lower alkoxy group or a

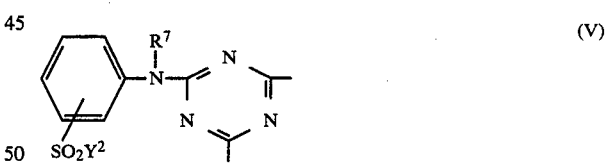

group; and X has the same definition as in the above-indicated general formula (I));

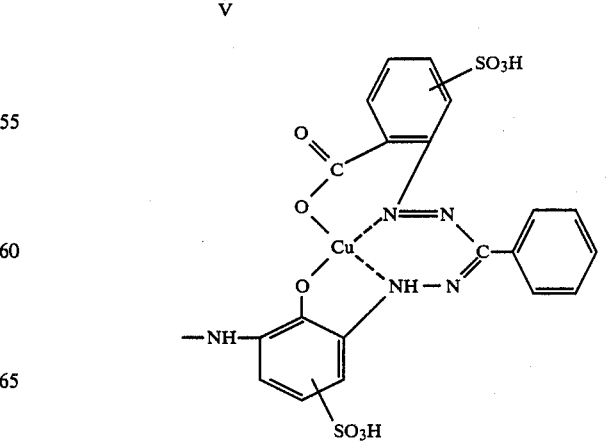

(where: V represents a chlorine atom, a fluorine atom, or a —NHC₂H₄SO₃H group; R⁷ denotes a hydrogen atom or a lower alkyl group which may contain therein a substituent; and Y² indicates a —CH=CH₂ group, a —C₂H₄OSO₃H group or a —OH group, provided however that when V denotes a —NHC₂H₄SO₃H group, Y₂ is a —C=CH₂ group or a —C₂H₄OSO₃H group); and

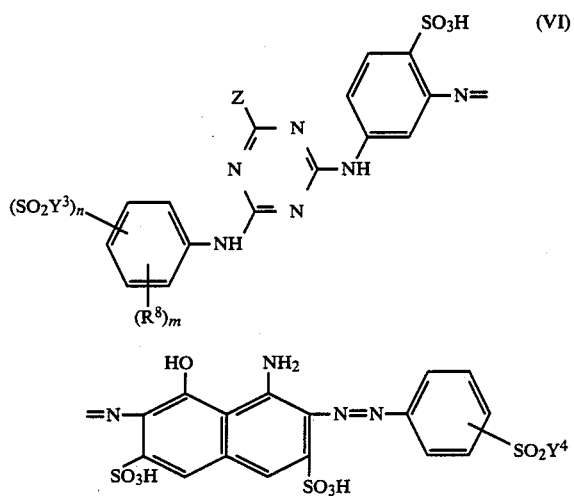

(where: R⁸ denotes a chlorine atom, a —COOH group or a —OH group; each of Y³ and Y⁴ indicates a —CH=CH₂ group, a —C₂H₄OSO₃H group or a —OH group; m and n are integers of 0 or 1, but, in no case, they will be 0 at the same time; and Z has the same definition as in the above-indicated general formula (VI)).

In the following, the present invention will be explained in detail.

The present invention, as its premises, is to use, as the red dye, the reactive dye represented by the afore-indicated general formula (I).

Examples of the lower alkyl group represented by R¹ and R² in this general formula (I) and which may contain therein a substituent are: those unsubstituted alkyl groups in the form of straight chain or branched chain and containing therein 1 to 4 carbon atoms; and those lower alkyl group substituted by a those hydroxy group, a cyano group, a halogen atom or an alkoxy group such as 2-hydroxyethyl, 2-cyanoethyl, cyanomethyl, 2-chloroethyl or 3-ethoxypropyl. Preferred groups for R¹ are a methyl group and an ethyl group, and preferred groups for R² are a hydrogen atom, a methyl group and an ethyl group, of which hydrogen is particularly preferred. As the lower alkyl group represented by R³, there may be enumerated unsubstituted alkyl groups in the form of straight chain or branched chain and containing therein 1 to 4 carbon atoms. Also, as the halogen atoms represented by R³, there may be exemplified a bromine atom and a chlorine atom. Preferred groups for R³ are a hydrogen atom, a methyl group, an ethyl group, a chlorine atom and a bromine atom, of which a hydrogen atom is particularly preferred.

As the red reactive dye of the general formula (I), those containing therein a methyl group or an ethyl group as R¹ and hydrogen atoms as R² and R³ are particularly preferred. Incidentally, a part of the structure of the reactive dye represented by the general formula (I) has already been known.

The following, explanations will be given as to the reactive dye of the general formula (II) which has been selected as the yellow dye. This dye also includes the structurally known dye, and, as one example, Japanese Unexamined Patent Publication No. 96174/1984 discloses a part of the reactive dye to be embraced by the general formula (II).

Examples of the lower alkyl groups represented by R⁵ in the general formula (II) and which may contain therein a substituent are those same as in the above-mentioned R¹ and R². Preferred groups for R⁵ are a hydrogen atom, a methyl group and an ethyl group, of which a hydrogen atom is particularly preferred. Preferred groups of R⁴ are a —NHCOCH₃ group and a —NHCONH₂ group, of which a —NHCOCH₃ group is particularly preferred. Further, the position for introducing a —SO₂X group to be coupled with the benzene ring should preferably be at the metha- or para-position to the position of a nitrogen atom bound to the benzene ring, of which the metha-position is particularly preferred. As the yellow reactive dye of the general formula (II), those containing therein a —NHCOCH₃ group as R⁴ and a hydrogen atom as R⁵ are particularly preferred.

Further, explanations will be given as to the reactive dyes represented by the general formulas (III) to (VI), which are selected as the blue dyes in the present invention. These reactive dyes also include the known structures, wherein a part of the dyes embraced by the general formula (IV) are disclosed in, for example, Japanese Unexamined Patent Publication No. 128380/1981; a part of the dyes embraced by the general formula (V) are disclosed in, for example, Japanese Unexamined Patent Publication No. 15451/1984; and a part of the dyes embraced by the general formula (VI) are disclosed in, for Example, Japanese Unexamined Patent Publication No. 799/1980.

As the lower alkyl group to be represented by R⁶ in the general formula (III), there may be enumerated those alkyl groups having 1 to 4 carbon atoms such as a methyl group, an ethyl group, a propyl group and a butyl group. Of these alkyl groups, a methyl group is preferred.

As the lower alkoxy group to be represented by W in the general formula (IV), there may be exemplified those alkoxy groups having 1 to 4 carbon atoms such as a methoxy group, an ethoxy group and a propoxy group. Of these alkoxy groups, a methoxy group is preferred. Preferred example of the blue reactive dyes of the general formula (IV) are particularly those containing therein a —CH=CH₂ group or a —C₂H₄OSO₃H group as Y¹, a chlorine atom as Z, and a methoxy group as W, or those containing therein a —OH group as Y¹, a chlorine atom or a fluorine atom as Z, and a

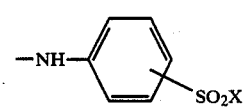

group as W.

As the lower alkyl groups represented by R⁷ in the general formula (V) and which may contain therein a substituent, there may be exemplified those groups similar to $R^1$ and $R^2$ above. $R^7$ is preferably a hydrogen atom, a methyl group or an ethyl group. V should preferably be a chlorine atom or a $-NHC_2H_4SO_3H$ group, while $Y^2$ should preferably be a $-CH=CH_2$ group or a $-C_2H_4OSO_3H$ group. As the blue reactive dyes of the general formula (V), those containing therein a hydrogen atom as $R^7$, a $-NHC_2H_4SO_3H$ group as V and a $-CH=CH_2$ group or a $-C_2H_4OSO_3H$ group as $Y^2$ are particularly preferred.

As the blue reactive dyes of the general formula (VI), those containing therein $-OH$ groups as $Y^3$ and $Y^4$, and a fluorine atom as Z, m being 0 and n being 1, are particularly preferred.

In the present invention, the above-mentioned reactive dyes are all present in the form of free acids or their salts. Preferred salts of such free acids are usually alkali metal salts or alkaline earth metal salts such as lithium salt, sodium salt, potassium salt and calcium salt.

By the way, these reactive dyes represented by the foregoing general formulas (I) to (VI) can be produced in accordance with known methods, hence there is no particular restriction on the method of their production.

It is the cardinal point of the present invention that the red reactive dye of the general formula (I) is made the base, with which the yellow reactive dye of the general formula (II) and/or the blue reactive dye of the general formula (III) to (VI) is blended. In short, the particularly excellent effect of the present invention can be obtained by selecting the particular yellow dye or blue dye from a large number of dyes, and blending such yellow or blue dye with the particular red dye. The effect of the present invention, cannot be obtained from combination of the above-mentioned particular red dye and numerous other yellow or blue dyes which are available at hand.

The mixing ratio of the yellow and/or blue dye with respect to the red dye according to the present invention may be determined depending on the intended color hue of the dyed material, and it is usually in a range of from 0.05 to 50 times by weight, preferably from 0.1 to 10 times by weight in total.

On the other hand, the mixing ratio of both yellow dye and blue dye to be blended with the red dye is in a range of 0 to 100/100 to 0. In this way, the dye mixture according to the present invention is a combination of the red dye and the yellow dye or the blue dye, and, in addition, a combination of the red dye and both yellow and blue dyes.

Incidentally, of these blue dyes represented by the general formulas (III) to (VI), the reactive dye of the general formula (III) to (V) is particularly preferred. A mixture of the red reactive dye represented by the general formula (I) and the yellow reactive dye represented by the general formula (II) is also preferred.

The dye mixtures according to the present invention are mainly suited as the reactive dye for exhaustion-dyeing of cellulosic fibers.

Examples of the cellulose-containing fibers to be the object of dyeing according to the present invention are usually: those cellulosic fibers such as cotton, viscose rayon, cupra ammonium rayon, hemp; and mixed fibers of these cellulosic fibers and polyester, cellulose triacetate, cellulose diacetate, polyacrylonitrile, polyamide, wool, sink and so on.

The exhaustion-dyeing of the cellulose-containing fibers by use of the reactive dyes according to the present invention is carried out in the presence of an alkali such as sodium bicarbonate, sodium carbonate, lithium carbonate, caustic soda or triethylamine, and of an inorganic salt such as Glauber's salt or edible salt, preferably Glauber's salt. The quantity of the alkali to be used in this case is usually 10 to 30 g per 1 liter of the dye bath. Usually, the dye bath has a pH value of from 10 to 13.

The quantity of the inorganic salt to be used may be as large as 50 g per 1 liter as is the case with the ordinary exhaustion-dyeing. In the case of the present invention, however, since use is made of a dye mixture prepared by blending a particular red reactive dye with a particular yellow and/or blue reactive dye, the inorganic salt may be as small as 5 to 40 g per 1 liter of the dye bath for the sufficient result of dyeing. Further, the quantity of this inorganic salt to be used may depend on the dyeing depth of the dyed fabric to be obtained. More specifically, in case the dyeing depth is of pale shade, it may range from 5 to 15 g per 1 liter of the dye bath; in the case of medium shade, it may range from 15 to 30 g per 1 liter of the dye bath; and in the case of heavy shade, it may be from 30 to 40 g per 1 liter of the dye bath.

The temperature for dyeing is usually from 40° to 80° C., or preferably from 40° to 60° C. The time for dyeing is from about 0.5 to 2 hours.

After the dyeing operation,, the dyed fabric is subjected, in accordance with the known processes, to soaping and rinsing, after which it is dried and recovered as the dyed article.

BEST MODE TO PRACTICE THE INVENTION

In the following, the present invention will be described in more detail in reference to examples thereof. It should however be noted that the present invention is not limited to these examples alone.

EXAMPLE 1

Into 200 ml of water, there was dissolved 0.2 g of a dye mixture composed of 0.1 g of the reactive dye as the red dye, which is represented by the following general formula (I-1) in the form of free acid:

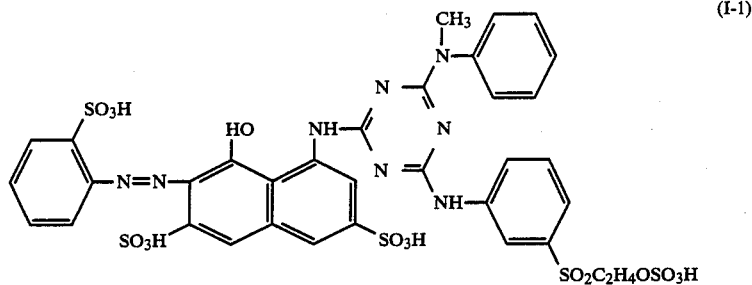

(I-1)

and 0.1 g of the reactive dye as the yellow dye, which is represented by the following general formula (II-1) in the form of free acid:

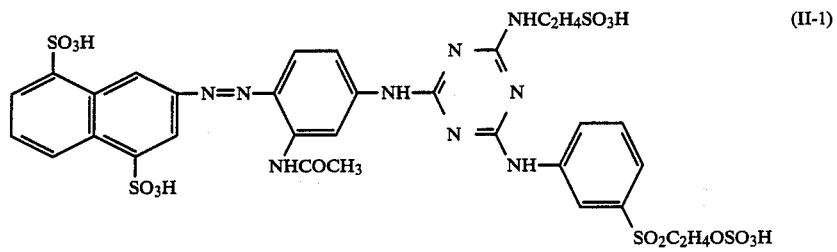

(II-1)

To this dye solution, there was further added 10 g of Glauber's salt to prepare a dye bath (concentration of Glauber's salt being 50 g/liter). Into this dye bath, 10 g of unmercerized cotton knitted fabric was immersed. The temperature of the dye bath was increased to 50° C. in 30 minutes, and then 3 g of sodium carbonate was added to the dye bath to conduct the exhaustion dyeing for one hour at this temperature level. After the dyeing, the dyed fabric was subjected to rinsing, soaping, rinsing and drying by the ordinary method, thereby obtaining the dyed fabric in orange color.

This dyed fabric was measured for its surface reflecting rate by means of a color difference meter (a product of Nippon Denshoku Kogyo K.K., Japan).

Also, in order to examine the salt-concentration dependency and the temperature dependency, during the dyeing operation, of the dye mixture used in this Example, the same exhaustion dyeing was carried out under the same conditions as above, with the exception of the following changes: (1) the concentration of Glauber's salt in the dye bath was made 25 g/liter; or (2) the dyeing temperature was set at 80° C.

Based on the results obtained from the above dyeing operations, the salt-concentration dependency and the temperature dependency of the dye mixture were found in accordance with the following definitions:

Salt-concentration dependency is represented by a difference between the surface reflecting rate of the dyed fabric with the concentration of Glauber's salt being 50 g/liter and the surface reflecting rate of the dyed fabric with the concentration of Glauber's salt being 10 g/liter (difference in color hue ($\Delta E$)): and Temperature dependency is represented by a difference between the surface reflecting rate of the dyed fabric at the dyeing temperature of 50° C. and the surface reflecting rate of the dyed fabric at the dyeing temperature of 80° C. (difference in color hue ($\Delta E$)).

The results of the measurement are shown in the following Table 1.

COMPARATIVE EXAMPLES 1 AND 2

The exactly same dyeing tests as in Example 1 above were conducted with the exception that the yellow dye used in Example 1 was replaced by the following known type of yellow dyes having the following structural formulas (a) for Comparative Example 1 and (b) for Comparative Example 2 (both being in the form of free acid).

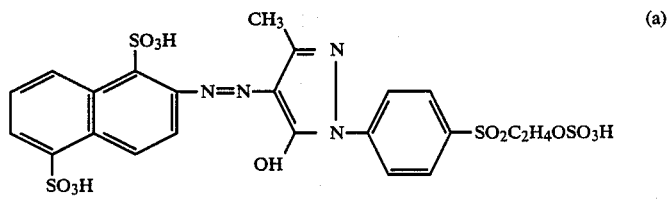

(a)

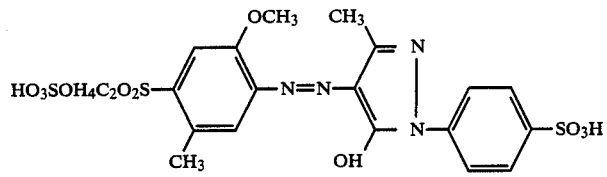
(b)

The results are shown in Table 1.

TABLE 1

|  | Salt concentration dependency (25 g/liter/ 50 g/liter) ΔE* | Temperature dependency (80° C./50° C.) ΔE* |
|---|---|---|
| Example 1 | 1.98 | 3.84 |
| Comparative Example 1 | 4.49 | 6.93 |
| Comparative Example 2 | 4.35 | 7.52 |

Note: *While the value of ΔE should ideally be zero, it may practically be at an excellent level, if it is 3 or below for the salt-concentration dependency, and 4 or below for the temperature dependency.

EXAMPLE 2

The exactly same dyeing operation as in Example 1 above was conducted with the exception that, instead of using the yellow dye, 0.1 g of the reactive dye to be represented by the following general formula (V-1) in the form of free acid was used as the blue dye, thereby obtaining the dyed fabric in purple color.

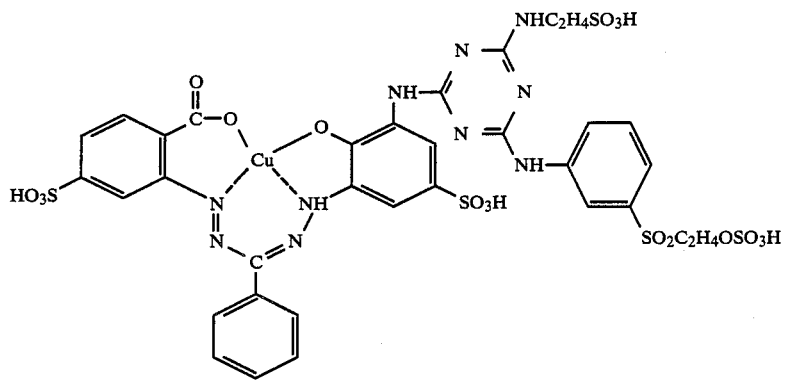
(V-1)

This dyed fabric was measured for its surface reflecting rate in the same manner as in Example 1 above. Also, the salt-concentration dependency and the temperature dependency of the dye mixture were measured in the same manner as in Example 1. The results are shown in Table 2.

COMPARATIVE EXAMPLES 3 TO 6

The exactly same dyeing tests as in Example 2 above were conducted with the exception that the blue dye used in Example 2 were replaced by the following known type of blue dyes having the structural formulas (c) for Comparative Example 3, (d) for Comparative Example 4, (e) for Comparative Example 5, and (f) for Comparative Example 6 (each being in the form of free acid).

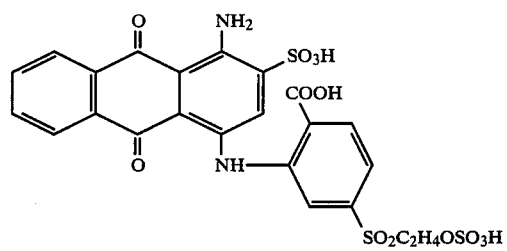
(c)

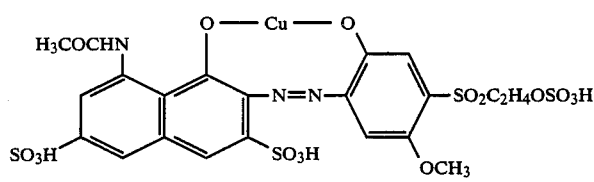
(d)

-continued

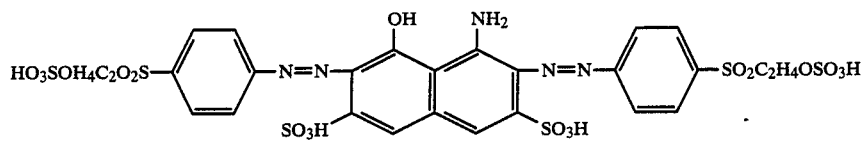
(e)

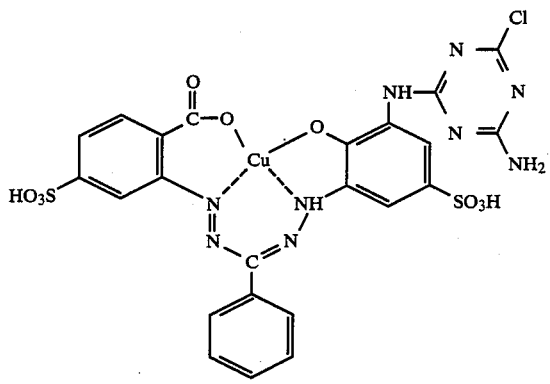
(f)

The results are shown in Table 2.

TABLE 2

| | Salt-concentration dependency (25 g/liter/ 50 g/liter) ΔE* | Temperature dependency (80° C./50° C.) ΔE* |
|---|---|---|
| Example 2 | 1.73 | 3.23 |
| Comparative Example 3 | 5.23 | 7.62 |
| Comparative Example 4 | 6.10 | 5.77 |
| Comparative Example 5 | 5.28 | 4.71 |
| Comparative Example 6 | 4.28 | 8.53 |

EXAMPLE 3

Into 200 ml of water, there was dissolved a dye mixture composed of 0.1 g of the reactive dye represented by the following structural formula (I-1) in the form of free acid, as the red dye; 0.1 g of the reactive dye represented by the following structural formula (II-1) in the form of free acid, as the yellow dye; and 0.1 g of the reactive dye represented by the following structural formula (III-1) in the form of free acid, as the blue dye.

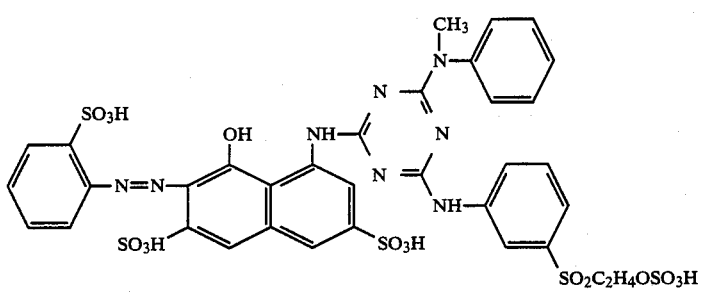
(I-1)

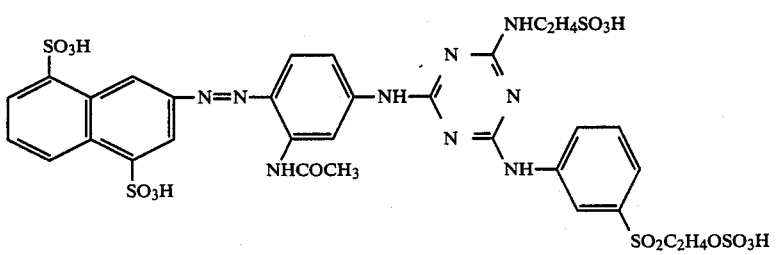
(II-1)

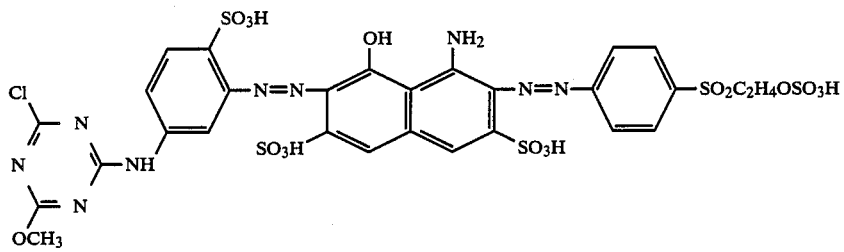
(III-1)

To this dye solution, there was further dissolved 5 g of Glauber's salt to prepare the dye bath (concentration of Glauber's salt being 25 g/liter). 10 g of cotton cloth was immersed in this dye bath. The temperature of the dye bath was elevated from room temperature (25° C.) to 60° C. in 30 minutes, after which 4 g of anhydrous sodium carbonate was added to it, and the exhaustion dyeing was conducted for one hour at this temperature level. After the dyeing operation, the dyed fabric was subjected to rinsing, soaping, rinsing and drying, thereby obtaining the dyed fabric in brown color.

The reactive fixing property of each component dye in the dye mixture to the material to be dyed was very satisfactory. Also, in the above-mentioned dyeing operation, the quantity of Glauber's salt to be used was increased from 5 g (i.e., 25 g/liter) to 10 g (i.e., 50 g/liter) to carry out the dyeing. When depth and color hue of the dyed fabric were compared between the different quantities of Glauber's salt used, there was found no substantial difference between them.

EXAMPLES 4 TO 6

The exactly same dyeing operation as in Example 3 was conducted with the exception that the mixing quantities of the reactive dyes (I-1), (II-1) and (III-1) were varied to those as shown in Table 3 below, thereby obtaining the dyed fabric in such hue shown in Table 3 below. It was found that, in all these Examples, the reactive fixing property of each component dye in the dye mixture to the fabric to be dyed was very satisfactory.

TABLE 3

| Example No. | Mixing quantity of reactive dyes | | | Color hue of dyed fabric |
|---|---|---|---|---|
| | (I-1) | (II-1) | (III-1) | |
| 4 | 0.05 g | 0.06 g | 0.16 g | grey |
| 5 | 0.2 g | 0.1 g | 0.05 g | scarlet |
| 6 | 0.09 g | 0.1 g | 0.03 g | beige |

COMPARATIVE EXAMPLE 7

The exactly same dyeing operation as in Example 3 above was conducted by use of 5 g of Glauber's salt, with the exception that the blue dye as used in Example 3 was replaced by 0.1 g of the reactive dye represented by the following structural formula (c) in the form of free acid, which is the known blue dye.

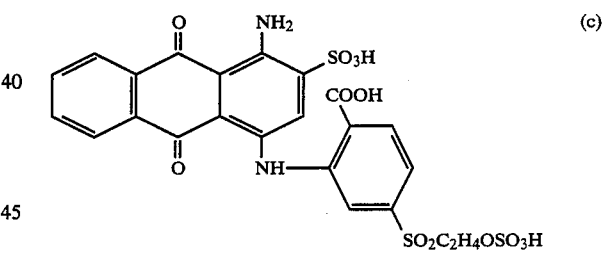
(c)

The color tone of the obtained dyed fabric was orange, not brown, which indicated that dyeability of this blue dye was considerably poor. In fact, the residual liquid in the dye bath had very strong bluish tone.

Also, the same dyeing operation as mentioned above was conducted with the exception that the quantity of Glauber's salt used was increased from 5 g (25 g/liter) to 10 g (50 g/liter), whereupon the dyed fabric as obtained had its color tone of brown.

EXAMPLES 7 TO 17

The exactly same dyeing operations as in Example 3 above were conducted with the exception that the reactive dye represented by the structural formula (I-1) as the red dye was replaced with those reactive dyes of the structural formulas (in the form of free acids) shown in the following Table 4. In all these cases, the reactive fixing property of each component dye in the dye mixtures to the fibers to be dyed was satisfactory, whereby the dyed fabric in heavy brown was obtained.

TABLE 4

[Structure: naphthalene core with HO, SO₃H groups, azo-linked to benzene-SO₃H, and connected via NH to a triazine ring bearing N(R¹)(aryl-R³) and N(R²)(aryl-SO₂X) substituents]

| No. | —R¹ | —⌬—R³ (aryl with R³) | —R² | —⌬—SO₂X (aryl with SO₂X) |
|---|---|---|---|---|
| 7 | —H | phenyl | —H | —C₆H₄—SO₂C₂H₄OSO₃H (meta) |
| 8 | " | " | —CH₃ | " |
| 9 | —C₂H₅ | phenyl | —H | —C₆H₄—SO₂C₂H₄OSO₃H (meta) |
| 10 | —C₂H₄OH | " | " | —C₆H₄—SO₂C₂H₄OSO₃H (para) |
| 11 | —H | 4-Cl-phenyl | " | —C₆H₄—SO₂C₂H₄OSO₃H (meta) |
| 12 | —CH₃ | phenyl | —C₂H₅ | —C₆H₄—SO₂C₂H₄OSO₃H (meta) |
| 13 | " | 2-CH₃-phenyl | —H | —C₆H₄—SO₂C₂H₄OSO₃H (meta) |
| 14 | —H | 4-C₃H₇-phenyl | —H | —C₆H₄—SO₂C₂H₄OSO₃H (meta) |

TABLE 4-continued

[Structure: naphthalene core with SO₃H, HO, NH-, SO₃H, SO₃H substituents and azo linkage to phenyl-SO₃H group, connected to triazine with two N(R)-phenyl substituents bearing R³ and SO₂X]

| No. | $-R^1$ | [phenyl with $R^3$] | $-R^2$ | [phenyl-$SO_2X$] |
|-----|--------|---------------------|--------|------------------|
| 15  | "      | [phenyl]—$C_2H_5$   | $-C_2H_4OH$ | [phenyl]—$SO_2CH=CH_2$ |
| 16  | $-CH_3$ | [phenyl]—Br        | $-H$   | [phenyl]—$SO_2C_2H_4OSO_3H$ |
| 17  | H      | [phenyl]            | $-C_2H_5$ | "              |

EXAMPLES 18 TO 27

The exactly same dyeing operations as in Example 3 above were conducted with the exception that the yellow dye used in Example 3 was replaced with those having the structural formulas (in the form of free acids) shown in the following Table 5, and the blue dye used in the same Example was replaced with those having the structural formulas (in the form of free acids) also shown in the following Table 5. As the result, it was found that, in all these Examples, the reactive fixing property of each component dye in the dye mixtures to the fiber material to be dyed was favorable, whereby the dyed fabrics in heavy brownish color tone were obtained.

TABLE 5

| | Yellow dye | Blue dye | Hue of dyed fabric |
|---|---|---|---|
| Example 18 | (structure) | (structure) | Greenish brown |
| Example 19 | (structure) | (structure) | Brown |
| Example 20 | " | (structure) | Greenish brown |

TABLE 5-continued

| Yellow dye | Blue dye | Hue of dyed fabric |
|---|---|---|
| Example 21 | (structure) | Brown |
| Example 22 | (structure) | Brown |
| Example 23 | (structure) | Brown |

TABLE 5-continued

| Yellow dye | Blue dye | Hue of dyed fabric |
|---|---|---|
| Example 24 | (structure) | Brown |
| Example 25 | (structure) | Brown |

TABLE 5-continued
| | Yellow dye | Blue dye | Hue of dyed fabric |
|---|---|---|---|
| Example 26 |  | 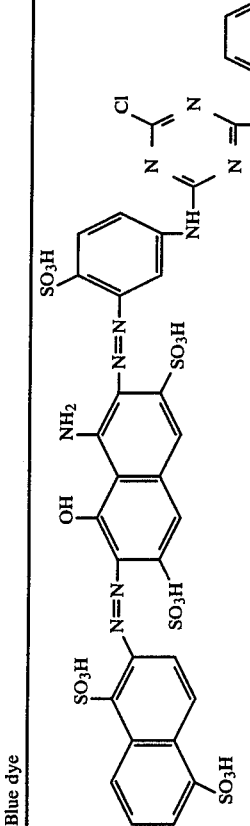 | Brown |
| Example 27 | 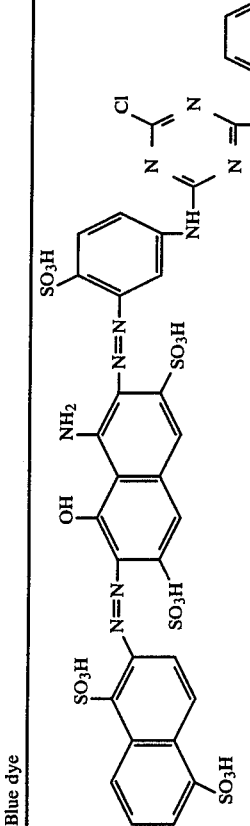 | 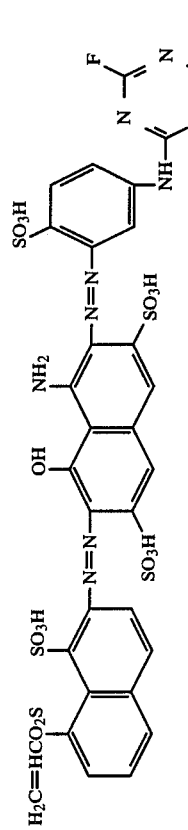 | Greenish brown |

EXAMPLES 28 TO 30

In the same manner as in Example 1 above, cellulosic fibers are dyed by use of dye mixtures, each having been composed of two kinds of red and blue dyes at a mixing ratio of about 1:1, wherein the red dye is reactive dye represented by the following structural formula (I-1) in the form of free acid:

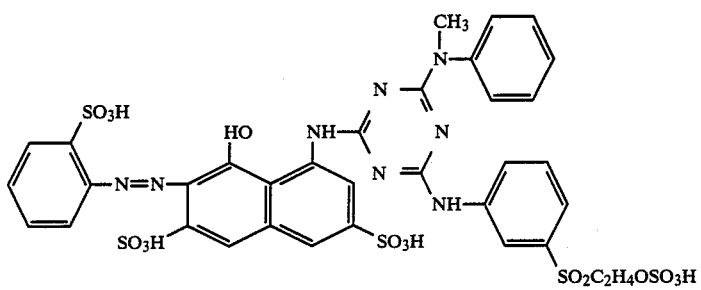

(I-1)

and the blue dye was a reactive dye represented by the following structural formula (III-1) in the form of free acid:

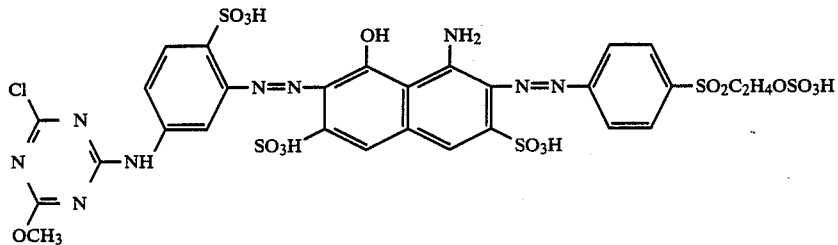

(III-1)

or a reactive dye represented by the following structural formula (IV-1) in the form of free acid;

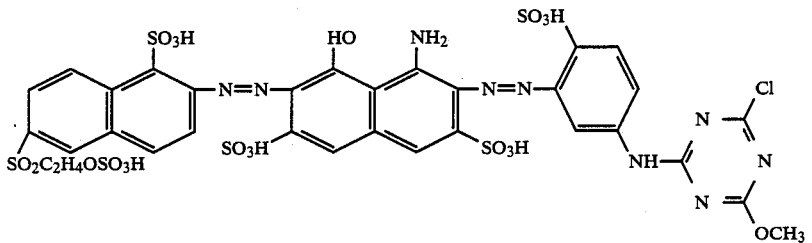

(IV-1)

or a reactive dye represented by the following structural formula (IV-1) in the form of free acid:

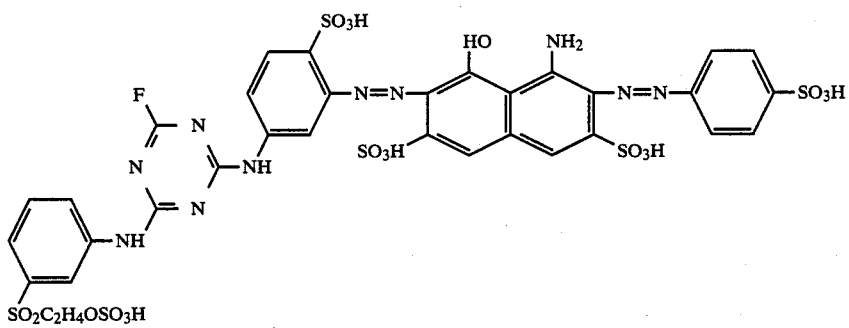

(VI-1)

The dyed fabrics as obtained would show excellent purple color, and the dye mixtures would display their salt-concentration dependency and the temperature dependency of an excellent level, which were comparable with those attained in Example 1 above.

INDUSTRIAL APPLICABILITY

The present invention is capable of preparing dye mixtures of a desired color hue for dyeing cellulose-containing fibers by belending a particular red dye with a particular yellow dye and/or blue dye in an appropriate quantity. With these dye mixtures, favorable dyeing of the fiber material can be done even under the condition wherein the inorganic salt is in a small content. That is to say, the dyeing can be done favorably even when the quantity of the inorganic salt to be used is reduced to about 1/5 to 1/10 of the quantity thereof used in the conventional methods. Accordingly, the presenet invention makes it possible to attain the resource-saving and the reduction in the cost for the dyeing operation in an industrialized scale.

Further, the dye mixtures of the present invention has the low temperature dependency and excellent reproducibility, even with a small amount of the inorganic salt, hence it is suitable for the industrial use.

We claim:

1. A water-soluble reactive dye mixture, wherein a yellow and/or blue water-soluble reactive dye is blended with at least one kind of red water-soluble reactive dyes represented by the following general formula (I) in the form of free acid:

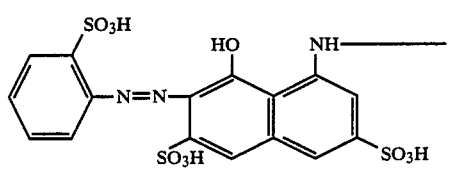
(I)

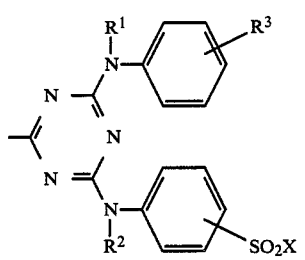

(where: each of $R^1$ and $R^2$ denotes a hydrogen atom or a lower alkyl group which may contain therein a substituent; $R^3$ indicates a hydrogen atom, a lower alkyl group or a halogen atom and X representes —CH=CH$_2$ or —C$_2$H$_4$OSO$_3$H), said water-soluble reactive dye mixture being characterized in that the yellow component is a water-soluble reactive dye represented by the following general formula (II) in the form of free acid:

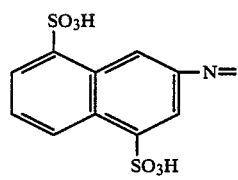
(II)

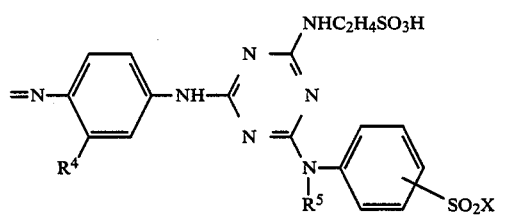

(where: $R^4$ represents a —NHCOCH$_3$ group, a —NHCOC$_2$H$_5$ group, a —NHCONH$_2$ group or a —NHCOSO$_2$CH$_3$ group; $R^5$ denotes a hydrogen atom or a lower alkyl group which may contain therein a substituent; and X has the same definition as in the preceding general formula (I)), and the blue component is at least one water-soluble reactive dye represented by the following general formulas (III) to (VI) in the form of free acid:

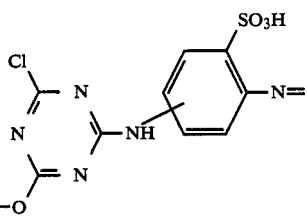
(III)

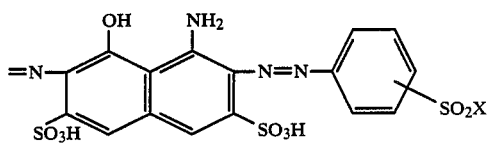

(where: $R^6$ indicates a lower alkyl group; and X has the same definition in the preceding general formula (I));

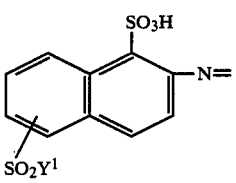
(IV)

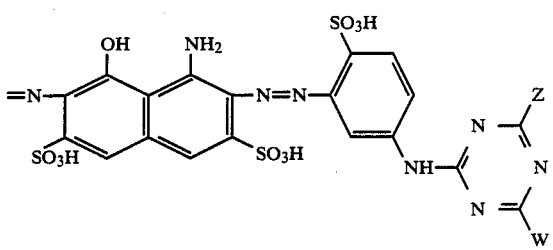

(where: $Y^1$ denotes a —CH=CH$_2$ group, a —C$_2$H$_4$OSO$_3$H group or a —OH group; Z represents a chlorine atom or a fluorine atom; W designates a lower alkoxy group or a

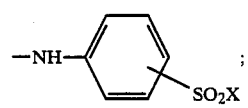

and X has the same definition as in the preceding general formula (I);

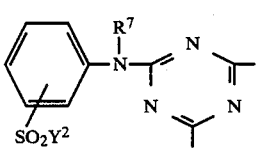
(V)

-continued at least one kind of red water-soluble reactive dyes to be represented by the following general formula (I) in the form of free acid:

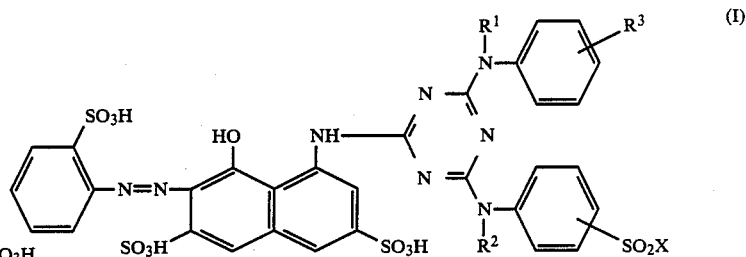
(I)

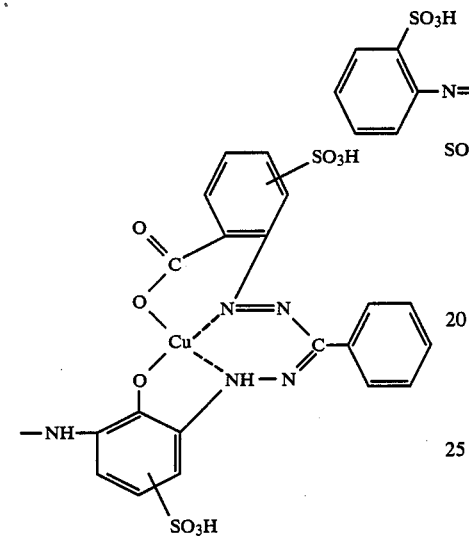

(where: V denotes a chlorine atom, a fluorine atom or a —NHC$_2$H$_4$SO$_3$H group; R$^7$ represents a hydrogen atom or a lower alkyl group which may contain therein a substituent; and Y$^2$ indicates a —CH=CH$_2$ group, a —C$_2$H$_4$OSO$_3$H group or a —OH group, provided that when V is a —NHC$_2$H$_4$SO$_3$H group, Y$^2$ is either a —CH=CH$_2$ group or a —C$_2$H$_4$OSO$_3$H group; and

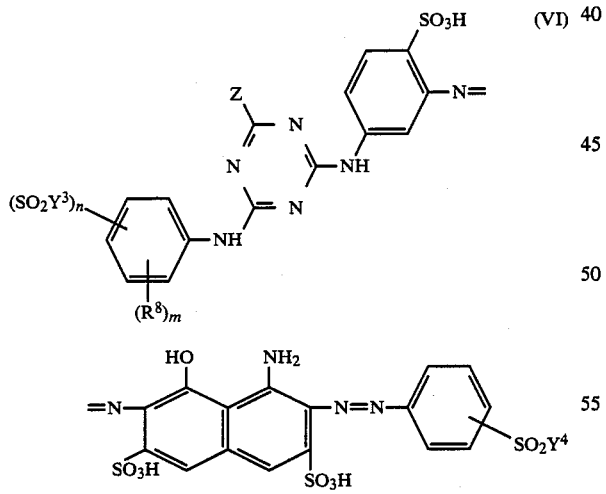
(VI)

(where: R$^8$ denotes a chlorine atom, a —COOH group or a —OH group; each of Y$^3$ and Y$^4$ represents a —CH=CH$_2$ group, a —C$_2$H$_2$OSO$_3$ group or a —OH group; m and n are numbers of 0 or 1, but cannot be 0 at the same time; and Z has the same definition as in the preceding general formula (IV)).

2. A water-soluble dye mixture, wherein a yellow and/or blue water-soluble reactive dye is blended with (where: each of R$^1$ and R$^2$ denotes a hydrogen atom or a lower alkyl group which may contain therein a substituent; R$^3$ represents a hydrogen atom, a lower alkyl group or a halogen atom; and X designates —CH=CH$_2$ or —C$_2$H$_4$OSO$_3$H), said water-soluble reactive dye mixture being characterized in that the yellow component is a water-soluble reactive dye represented by the following general formula (II) in the form of free acid:

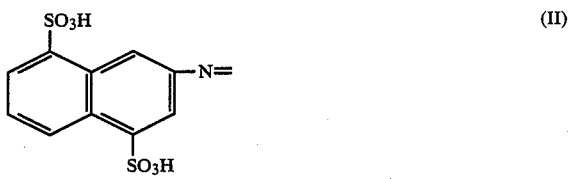
(II)

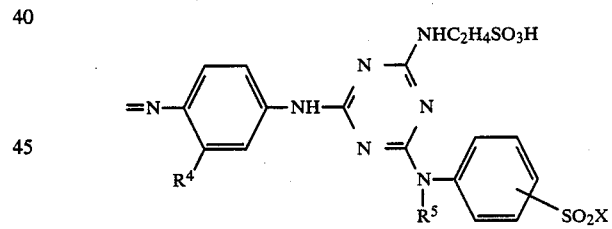

(where: R$^4$ denotes a —NHCOCH$_3$ group, a —NHCOC$_2$H$_5$ group, a —NHCONH$_2$ group or a —NHCOSO$_2$CH$_3$ group; R$_5$ represents a hydrogen atom or a lower alkyl group which may contain therein a substituent; and X has the same definition as in the preceding general formula (I)), and that the blue component is a water-soluble reactive dye represented by the following general formula (III) in the form of free acid:

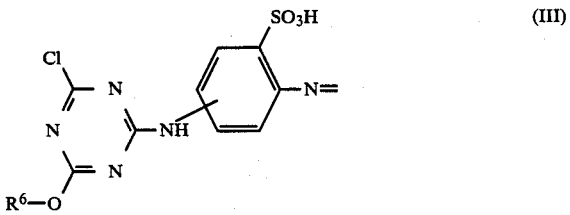
(III)

-continued

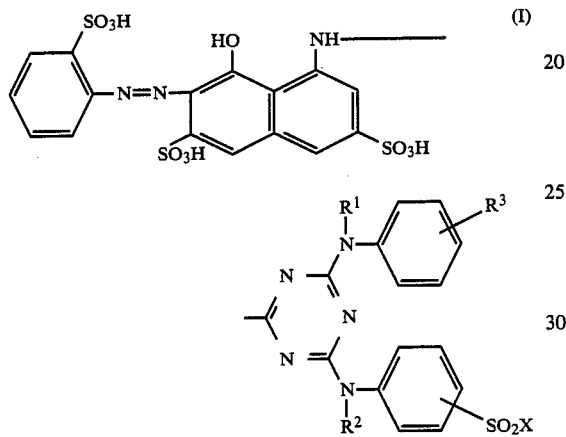

(where: $R^6$ denotes a lower alkyl group: and X has the same definition as in the preceding general formula (I)).

3. A water-soluble dye mixture, wherein a yellow and/or blue water-soluble reactive dye is blended with at least one kind of red water-soluble reactive dyes represented by the following general formula (I) in the form of free acid:

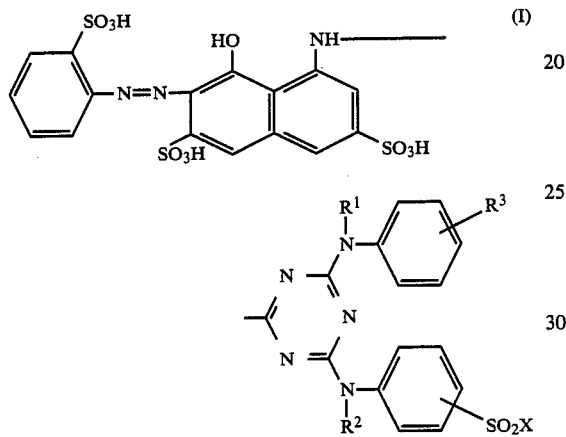

(where: each of $R^1$ and $R^2$ denotes a hydrogen atom or a lower alkyl group which may contain therein a substituent; $R^3$ represents a hydrogen atom, a lower alkyl group or a halogen atom; and X indicates —CH=CH$_2$ or —C$_2$H$_4$OSO$_3$H), said water-soluble reactive dye mixture being characterized in that the yellow component is a water-soluble reactive dye represented by the following general formula (II) in the form of free acid:

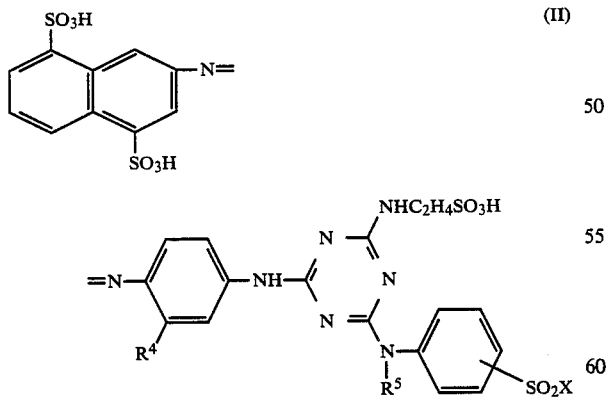

(where: $R^4$ represents a —NHCOCH$_3$ group, a —NHCOC$_2$H$_5$ group, a —NHCONH$_2$ group or a —NHCOSO$_2$CH$_3$ group; $R^5$ indicates a hydrogen atom or a lower alkyl group which may contain therein a substituent; and X has the same definition as in the preceding general fromula (I), and that the blue component is a water-soluble reactive dye represented by the following general formula (IV) in the form of free acid:

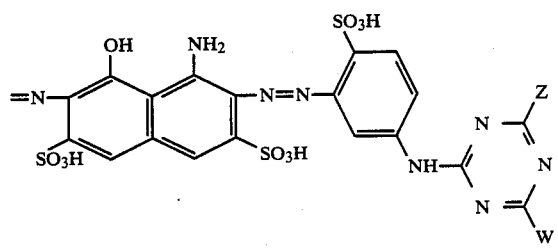

(where: $Y^1$ denotes a —CH=CH$_2$ group, a —C$_2$H$_4$OSO$_3$H group or a —OH group; Z designates a chlorine atom or a fluorine atom; W represents a lower alkoxy group or a

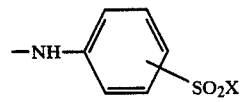

group: and X has the same definition as in the preceding general formula (I)).

4. A water-soluble reactive dye mixture, wherein a yellow and/or blue water-soluble reactive dye is blended with at least one kind of red water-soluble reactive dyes represented by the following general formula (I) in the form of free acid:

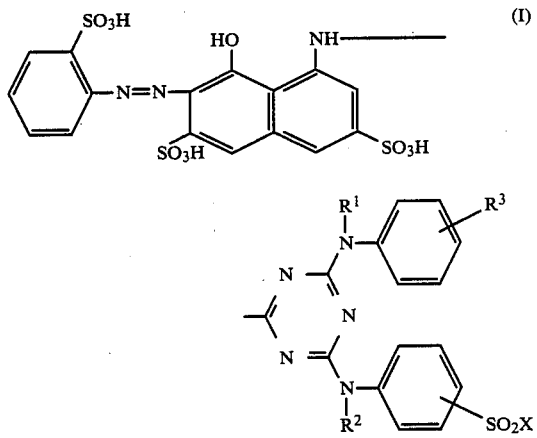

(where: each of $R^1$ and $R^2$ denotes a hydrogen atom or a lower alkyl group which may contain therein a substituent; $R^3$ represents a hydrogen atom, a lower alkyl group or a halogen atom and X indicates —CH=CH$_2$ or —C$_2$H$_4$OSO$_3$H), said water-soluble reactive dye mixture being characterized in that the yellow component is water-soluble reactive dye represented by the following general formula (II) in the form of free acid:

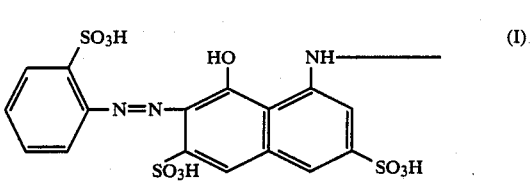

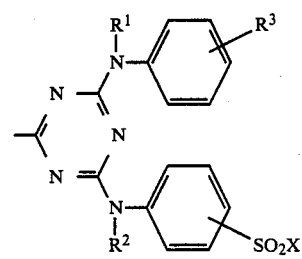

(where: each of $R^1$ and $R^2$ represents a hydrogen atom or a lower alkyl group which may contain therein a substituent; $R^3$ designates a hydrogen atom, a lower alkyl group or a halogen atom and X indicates —CH=CH$_2$ or —C$_2$H$_4$OSO$_3$H), said water-soluble reactive dye mixture being characterized in that the yellow component is a water-soluble reactive dye represented by the following general formula (II) in the form of free acid:

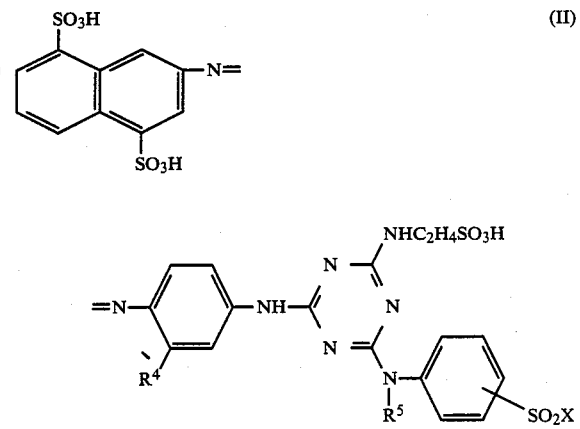

(where: $R^4$ denotes a —NHCOCH$_3$ group, a —NHCOC$_2$H$_5$ group, a —NHCONH$_2$ group or a —NHCOSO$_2$CH$_3$ group; $R^5$ represents a hydrogen atom or a lower alkyl group which may contain therein a substituent; and X has the same definition as in the preceding general formula (I)), and that the blue component is water-soluble reactive dye represented by the following general formula (VI) in the form of free acid:

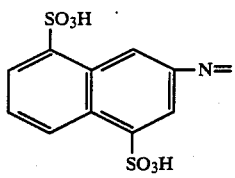

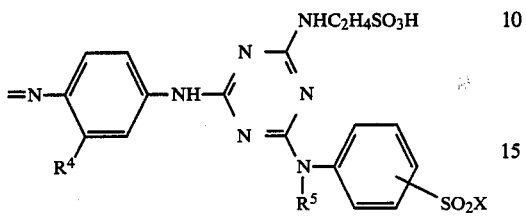

(wherein: $R^4$ denotes a —NHCOCH$_3$ group, a —NHCOC$_2$H$_5$ group, a —NHCONH$_2$ group or a —NHCOSO$_2$CH$_3$ group; $R^5$ indicates a hydrogen atom or a lower alkyl group which may contain therein a substituent; and X has the same definition as in the preceding general formula (I)), and that the blue component is a water-soluble reactive dye represented by the following general formula (V) in the form of free acid:

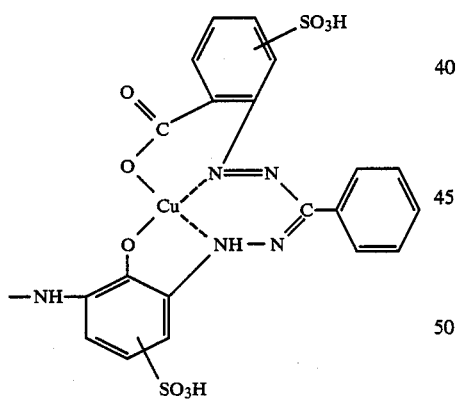

(wherein: V denotes a chlorine atom, a fluorine atom or a —NHC$_2$H$_4$CO$_3$H group; $R^7$ represents a hydrogen atom or a lower alkyl group which may contain therein a substituent; and $Y^2$ designates a —CH=CH$_2$ group, a —C$_2$H$_4$OSO$_3$H group or a —OH group, provided that when V is a —NHC$_2$H$_4$SO$_3$H group, $Y^2$ is either a —CH=CH$_2$ group or a —C$_2$H$_4$OSO$_3$H group).

5. A water-soluble reactive dye mixture, wherein a yellow and/or blue water-soluble reactive dye is belnded with at least one kind of red water-soluble reactive dyes represented by the following general formula (I) in the form of free acid:

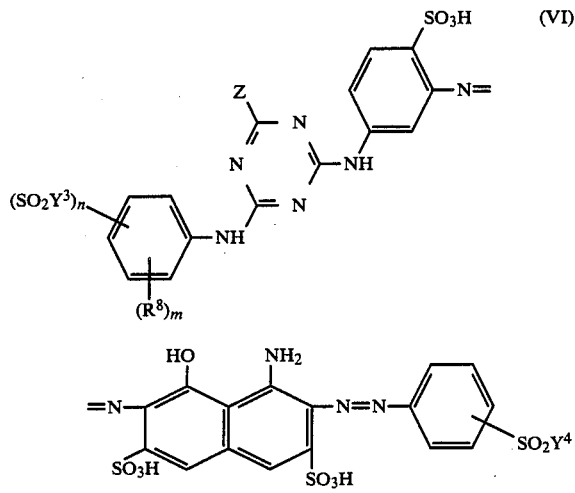

(where: $R^8$ indicates a chlorine atom, a —COOH group or a —OH group; each of $Y^3$ and $Y^4$ designates a —CH=CH$_2$ group, a —C$_2$H$_4$OSO$_3$H group or a —OH group; m and n are numbers of 0 or 1, but cannot be 0 at the same time; and Z has the same definition as in the preceding general formula (IV)).

6. The water-soluble reactive dye mixture according to any one of claims 1 to 5, characterized in that a mixing ratio of the yellow and/or blue water-soluble reactive dye with respect to the red water-soluble reactive dye ranges from 0.05 to 50 times by weight in total, and that a mixing ratio between the yellow water-soluble reactive dye and the blue water-soluble reactive dye is 0 to 100:100 to 0.

7. The water-soluble reactive dye mixture according to any one of claims 1 to 5, characterized in that a mixing ratio of the yellow and/or blue water-soluble reactive dye with respect to the red water-soluble reactive dye ranges from 0.1 to 10 times by weight in total, and that a mixing ratio between the yellow water-soluble reactive dye and blue water-soluble reactive dye is 0 to 100:100 to 0.

8. The water-soluble reactive dye mixture according to any one of claims 1 to 5, characterized in that it is used for the exhaustion-dyeing of cellulosic fibers.

9. The water-soluble reactive dye mixture according to any one of claims 1 to 5, characterized in that the red water-soluble reactive dye is one as represented by the general formula (I), wherein $R^1$ is a methyl group or an ethyl group; and $R^2$ is a hydrogen atom, a methyl group or an ethyl group.

10. The water-soluble reactive dye mixture according to any one of claims 1 to 5, characterized in that the red water-soluble reactive dye is one as represented by the general formula (I), wherein $R^3$ is a hydrogen atom, a methyl group, an ethyl group, a chlorine atom or a bromine atom.

11. The water-soluble reactive dye mixture according to any one of claims 1 to 5, characterized in that the red water-soluble reactive dye is one as represented by the general formula (I), wherein $R^2$ and $R^3$ are hydrogen atoms.

12. The water-soluble reactive dye mixture according to any one of claims 1 to 5, characterized in that the red water-soluble reactive dye is one as represented by the general formula (I), wherein $R^1$ is a methyl group or an ethyl group; and $R^2$ and $R^3$ are hydrogen atoms.

13. The water-soluble reactive dye mixture according to any one of claims 1 to 5, characterized in that the yellow water-soluble reactive dye is one as represented by the general formula (II), wherein $R^4$ is a —NHCOCH$_3$ group or a —NHCONH$_2$ group.

14. The water-soluble reactive dye mixture according to any one of claims 1 to 5, characterized in that the yellow water-soluble reactive dye is one as represented by the general formula (II), wherein $R^5$ is a hydrogen atom, a methyl group or an ethyl group.

15. The water-soluble reactive dye mixture according to any one of claims 1 to 5, characterized in that the yellow water-soluble reactive dye is one as represented by the general formula (II), wherein $R^4$ is a —NHCOCH$_3$ group; and $R^5$ is a hydrogen atom.

16. The water-soluble reactive dye mixture according to claim 1 or 2, characterized in that the blue water-soluble reactive dye is one as represented by the general formula (III), wherein $R^6$ is a methyl group.

17. The water-soluble reactive dye mixtures according to claim 1 or 3, characterized in that the blue water-soluble reactive dye is one as represented by the general formula (IV), wherein $Y^1$ is a —CH=CH$_2$ group or a —C$_2$H$_4$OSO$_3$H group; Z is a chlorine atom; and W is a methoxy group.

18. The water-soluble reactive dye mixture according to claim 1 or 3 characterized in that the blue water-soluble reactive dye is one as represented by the general formula (IV), wherein $Y^1$ is a —OH group; Z is a chlorine atom or a fluorine atom; and W is a

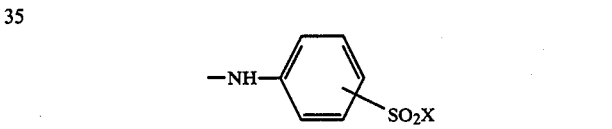

group.

19. The water-soluble reactive dye mixture according to claim 1 or 4, characterized in that the blue water-soluble reactive dye is one as represented by the general formula (V), wherein $R^7$ is a hydrogen atom; V is a —NHC$_2$H$_4$SO$_3$H group; and $Y^2$ is a —CH=CH$_2$ group or a —C$_2$H$_4$OSO$_3$H group.

20. The water-soluble reactive dye mixture according to claim 1 or 5, characterized in that the blue water-soluble reactive dye is one as represented by the general formula (VI), wherein $Y^3$ and $Y^4$ are —OH groups; Z is a fluorine atom; m is 0; and n is 1.

21. The water-soluble reactive dye mixture according to claim 1, characterized in that the blue component is a water-soluble reactive dye represented by the general formula (III) or (V).

22. The water-soluble reactive dye mixture according to claim 1, characterized in that it is a mixture of a red water-soluble reactive dye represented by the general formula (I) and a yellow water-soluble ractive dye represented by the general formula (II).

23. A method of dyeing cellulosic fibers by the exhaustion dyeing method in the presence of an alkali and an inorganic salt, using a dye mixture composed of a blend of at least one kind of red water-soluble reactive dyes represented by the following general formula (I) in the form of free acid:

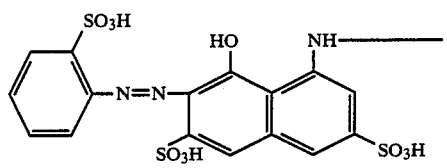 (I)

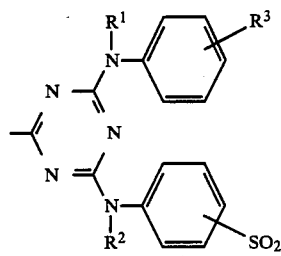

(where: each of R¹ and R² represents a hydrogen atom or a lower alkyl group which may contain therein a substituent; R³ denotes a hydrogen atom, a lower alkyl group or a halogen atom; and X indicates —CH=CH₂ or —C₂H₄OSO₃H), and a yellow and/or blue water-soluble reactive dye, said method being characterized in that the yellow component is a water-soluble reactive dye represented by the following general formula (II) in the form of free acid:

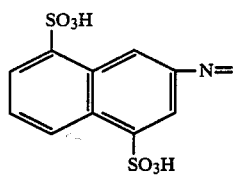 (II)

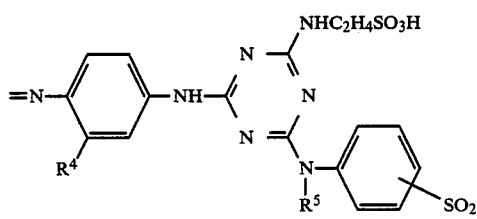

(where: R⁴ is a —NHCOCH₃ group, a —NHCOC₂H₅ group, a —NHCONH₂ group or a —NHCOSO₂CH₃ group; R⁵ denotes a hydrogen atom or a lower alkyl group which may contain therein a substituent; and X has the same definition as in the preceding general formula (I)), and that the blue component is at least one water-soluble reactive dye represented by the following general formulas (III) to (IV) in the form of free acid:

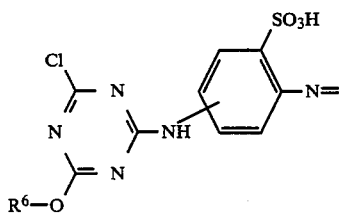 (III)

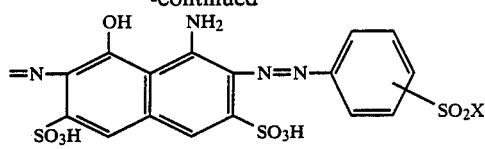

(where: R⁶ indicates a lower alkyl group; and X has the same definition as in the preceding general formula (I));

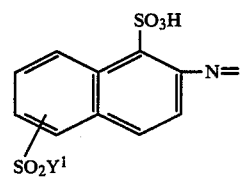 (IV)

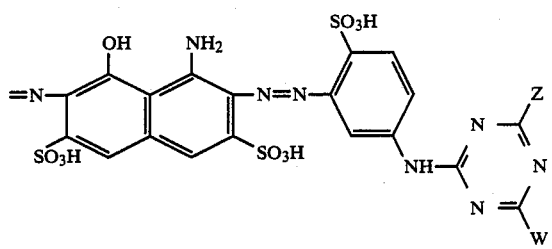

(where: Y¹ indicates a —CH=CH₂ group, a —C₂H₄OSO₃H group or a —OH group; Z denotes a chlorine atom or a fluorine atom; W designates a lower alkoxy or a

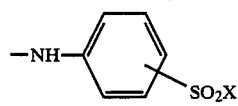

group; and X has the same definition as in the preceding general formula (I));

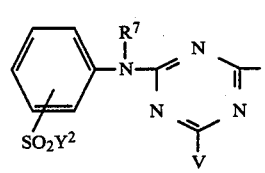 (V)

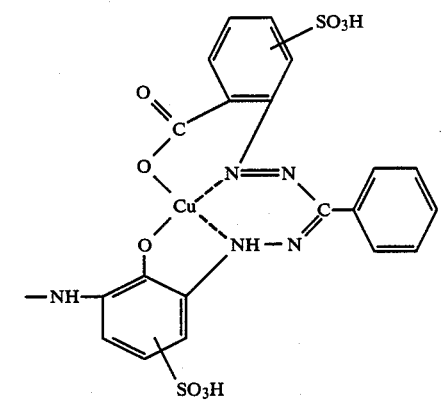

(where: V denotes a chlorine atom, a fluorine atom or a —NHC$_2$H$_4$SO$_3$H group; R$^7$ indicates a hydrogen atom or a lower alkyl group which may contain therein a substituent; and Y$^2$ represents a —CH=CH$_2$ group, a —C$_2$H$_4$OSO$_3$H group or a —OH group, provided that when V is a —NHC$_2$H$_4$SO$_3$H group, Y$^2$ is either a —CH=CH$_2$ group or a —C$_2$H$_4$OSO$_3$H group);

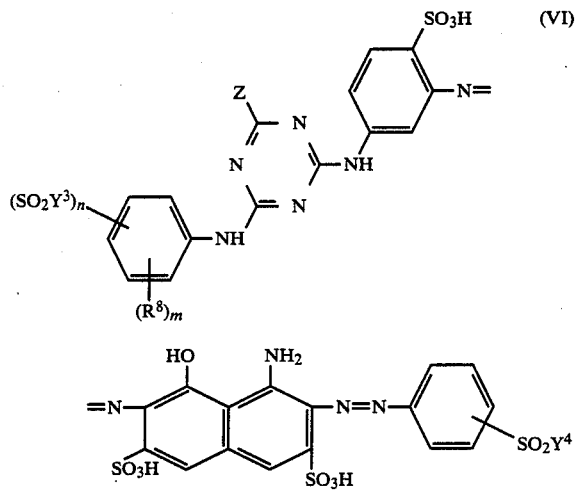

(VI)

(where: R$^8$ indicates a chlorine atom, a —COOH group or a —OH group; each of Y$^3$ and Y$^4$ denote a —CH=CH$_2$ group, a —C$_2$H$_4$OSO$_3$H group or a —OH group; m and n are numbers of 0 or 1, but cannot be 0 at the same time; and Z has the same definition as in the preceding general formula (IV)).

24. The method of dyeing according to claim 23, characterized in that the exhaustion dyeing is conducted in a dye bath having the concentration of the inorganic salt ranging from 5 to 40 g per 1 liter of said dye bath.

25. The method of dyeing according to claim 23 or 24, characterized in that said inorganic salt is Glauber's salt.

26. The method of dyeing according to claim 23, characterized in that the exhaustion dyeing is conducted in a dye bath having a pH of from 10 to 13.

27. The method of dyeing according to claim 23, characterized in that the exhaustion dyeing is conducted at a dyeing temperature of from 40° to 80° C.

28. The method of dyeing according to claim 23, characterized in that a mixing ratio of the yellow and-/or blue water-soluble reactive dye with respect to the red water-soluble reactive dye ranges from 0.05 to 50 times by weight in total, and a mixing ratio between the yellow water-soluble reactive dye and the blue water-soluble reactive dye is 0 to 100:100 to 0.

29. The method of dyeing according to claim 23, characterized in that a mixing ratio of the yellow and-/or blue water-soluble reactive dye with respect to the red water-soluble reactive dye ranges from 0.1 to 10 times by weight in total, and a mixing ratio between the yellow water-soluble reactive dye and the blue water-soluble reactive dye is 0 to 100:100 to 0.

30. The method of dyeing according to claim 23, characterized in that the red water-soluble reactive dye is one as represented by the general formula (I), wherein R$^1$ is a methyl group or an ethyl group; and R$^2$ and R$^3$ are hydrogen atoms.

31. The method of dyeing according to claim 23, characterized in that the yellow water-soluble reactive dye is one as represented by the general formula (II), wherein R$^4$ is a —NHCOCH$_3$ group, and R$^5$ is a hydrogen atom.

32. The method of dyeing according to claim 23, characterized in that the blue water-soluble reactive dye is one as represented by the general formula (III), wherein R$^6$ is a methyl group.

33. The method of dyeing according to claim 23, characterized in that the blue water-soluble reactive dye is one as represented by the general formula (IV), wherein Y$^1$ is a —CH=CH$_2$ group or a —C$_2$H$_4$OSO$_3$H group; Z is a chlorine atom; and W is a methoxy group.

34. The method of dyeing according to claim 23, characterized in that the blue water-soluble reactive dye is one as represented by the general formula (IV), wherein Y$^1$ is a —OH group; Z is a chlorine atom or a fluorine atom; and W is a

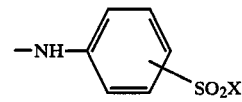

group.

35. The method of dyeing according to claim 23, characterized in that the blue water-soluble reactive dye is one as represented by the general formula (V), wherein R$^7$ is a hydrogen atom; V is a —NHC$_2$H$_4$SO$_3$H group; and Y$^2$ is a —CH=CH$_2$ group or a —C$_2$H$_4$OSO$_3$ group.

36. The method of dyeing according to claim 23, characterized in that the blue water-soluble reactive dye is one as represented by the general formula (VI), wherein Y$^3$ and Y$^4$ are —OH groups; Z is a fluorine atom; m is 0 and n is 1.

37. The method of dyeing according to claim 23, characterized in that the blue dye is the water-soluble reactive dye represented by the general formula (III) or (V).

38. The method of dyeing according to claim 23, characterized in that said water-soluble reactive dye mixture is a mixture of the red water-soluble reactive dye represented by the general formula (I) and the yellow water-soluble reactive dye represented by the general formula (II).

* * * * *

UNITED STATES PATENT AND TRADEMARK OFFICE
CERTIFICATE OF CORRECTION

PATENT NO. : 4,872,881

DATED : October 10, 1989

INVENTOR(S) : FUJITA ET AL

It is certified that error appears in the above-identified patent and that said Letters Patent is hereby corrected as shown below:

Column 17, Table 4, The first appearing formula:

TABLE 4

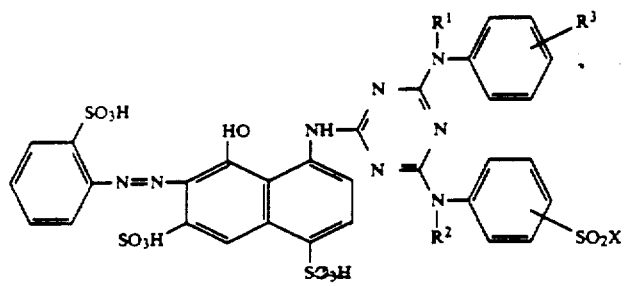

Should read as follows: TABLE 4

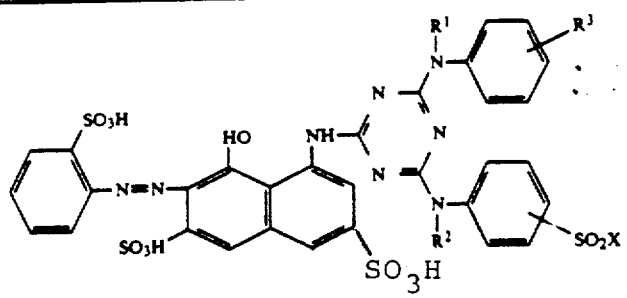

UNITED STATES PATENT AND TRADEMARK OFFICE
CERTIFICATE OF CORRECTION

PATENT NO. : 4,872,881
DATED : October 10, 1989
INVENTOR(S) : FUJITA ET AL

It is certified that error appears in the above-identified patent and that said Letters Patent is hereby corrected as shown below:

| Col. | Line |
|---|---|
| 33, | 62, delete "$C_2H_2OSO_3$" and insert --$C_2H_4OSO_3H$--; |
| 37, | 56, delete "$NHC_2H_4CO_3H$" and insert --$NHC_2H_4SO_3H$--; |
| 41, | 52, delete "(IV)" and insert --(VI)--; |
| 44, | 43, delete "$H_4OSO_3$" and insert --$H_4OSO_3H$--. |

Signed and Sealed this

Twenty-eighth Day of May, 1991

Attest:

HARRY F. MANBECK, JR.

Attesting Officer

Commissioner of Patents and Trademarks